US008055724B2

(12) United States Patent
Amegadzie et al.

(10) Patent No.: US 8,055,724 B2
(45) Date of Patent: Nov. 8, 2011

(54) SELECTION OF MIGRATION METHODS INCLUDING PARTIAL READ RESTORE IN DISTRIBUTED STORAGE MANAGEMENT

(75) Inventors: Augustine Amegadzie, Warren, NJ (US);
James T. Compton, Durham, NC (US);
Jerald W. Gross, Edison, NJ (US);
Stephen A Rago, Warren, NJ (US);
Christopher H. Stacey, Swindon (GB);
Eyal Zimran, Richmond (GB)

(73) Assignee: EMC Corporation, Hopkinton, MA (US)

( * ) Notice: Subject to any disclaimer, the term of this patent is extended or adjusted under 35 U.S.C. 154(b) by 1990 days.

(21) Appl. No.: 11/085,898

(22) Filed: Mar. 21, 2005

(65) Prior Publication Data
US 2006/0212746 A1 Sep. 21, 2006

(51) Int. Cl.
*G06F 15/16* (2006.01)
*G06F 15/173* (2006.01)
(52) U.S. Cl. .................................. 709/217; 709/223
(58) Field of Classification Search .................. 709/223, 709/217
See application file for complete search history.

(56) References Cited

U.S. PATENT DOCUMENTS

| 5,737,747 A | 4/1998 | Vishlitzky et al. |
| 5,835,954 A | 11/1998 | Duyanovich et al. ......... 711/162 |
| 5,893,140 A | 4/1999 | Vahalia et al. ............... 711/118 |
| 5,923,878 A | 7/1999 | Marsland ...................... 395/704 |
| 5,963,962 A | 10/1999 | Hitz et al. ...................... 707/202 |
| 5,974,503 A | 10/1999 | Venkatesh et al. |
| 5,974,563 A | 10/1999 | Beeler, Jr. ........................... 714/5 |
| 6,076,148 A | 6/2000 | Kedem ........................... 711/162 |
| 6,078,929 A | 6/2000 | Rao ..................................... 7/200 |
| 6,230,200 B1 | 5/2001 | Forecast et al. |
| 6,490,666 B1 | 12/2002 | Cabrera et al. ................ 711/161 |
| 6,665,689 B2 | 12/2003 | Muhlestein ................... 707/204 |
| 6,757,794 B2 | 6/2004 | Cabrera et al. ................ 711/156 |
| 6,792,047 B1 | 9/2004 | Bixby et al. |
| 6,792,518 B2 | 9/2004 | Armangau et al. ........... 711/162 |
| 6,804,719 B1 | 10/2004 | Cabrera et al. ................ 709/226 |
| 7,174,561 B2 | 2/2007 | Bixby et al. |
| 7,444,662 B2 | 10/2008 | Faibish et al. |
| 7,523,487 B2 * | 4/2009 | Muhlestein ....................... 726/3 |
| 7,546,364 B2 | 6/2009 | Raman et al. |
| 7,779,034 B2 * | 8/2010 | Pedersen et al. .............. 707/781 |
| 2003/0004920 A1 * | 1/2003 | Coverston et al. ................ 707/1 |

(Continued)

OTHER PUBLICATIONS

"Celerra Data Migration Service (CDMS)," EMC Corporation, Hopkinton, MA, Jan. 2002, 14 pages.

(Continued)

*Primary Examiner* — Larry Donaghue
(74) *Attorney, Agent, or Firm* — Richard Auchterlonie; Novak Druce & Quigg, LLP

(57) ABSTRACT

A hierarchical storage system is constructed from file servers and a policy engine server by building upon a file migration service. Offline attributes are added to file system inodes in a primary file server, file system parameters are added in the primary server, an offline read access method field is added to a connection database, and the primary file server is programmed to use these attributes and parameters for selecting a particular method (such as a partial read migration or a pass through read method) for read access to an offline file. In this fashion, the primary file server is provided with flexibility for selecting a particular one of a number of migration methods depending on various conditions, in order to improve the trade-off between the cost of storage and delay in file access.

6 Claims, 7 Drawing Sheets

U.S. PATENT DOCUMENTS

| | | | |
|---|---|---|---|
| 2003/0056069 A1* | 3/2003 | Cabrera et al. | 711/161 |
| 2003/0110467 A1* | 6/2003 | Balakrishnan | 717/104 |
| 2004/0107222 A1 | 6/2004 | Venkatesh et al. | 707/200 |
| 2004/0236777 A1* | 11/2004 | Pardikar et al. | 707/100 |
| 2006/0080521 A1* | 4/2006 | Barr et al. | 713/2 |
| 2008/0263007 A1* | 10/2008 | Schmidt | 707/3 |

OTHER PUBLICATIONS

"EMC Centera Solutions, EMC Avalon-Centera Single Point of Access Solution," EMC Corporation, Hopkinton, MA, Oct. 2002, 4 pages.

Technology Brief—Aug. 2002, "Automated Resource Management," The Enterprise Storage Group, Milford, MA, Aug. 2002, 3 pages.

"Oracle9i with Celerra File Server over NFS," EMC Corporation, Hopkinton, MA, Nov. 22, 2002, 15 pages.

Nancy Marrone, Product Brief—Apr. 2003, "Astrum's Active Storage Management Solution Key to EMC's Mid-Tier Software Offering," The Enterprise Storage Group, Milford, MA, Apr. 2003, 2 pages.

Data Sheet, "EMC AVALONidm, Intelligent data management to lower total cost of storage," EMC Corporation, Hopkinton, MA, Jul. 2003, 4 pages.

Jamie Gruener et al., "Digital Content and Storage Management in the Media and Entertainment Industry," The Yankee Group, Boston, MA, Nov. 2003, 16 pages.

*On Life in Information*, vol. 1, 2004, Doing More with Storage, EMC Corporation, Hopkinton, MA, Mar. 2004, 32 pages.

"Information Lifecycle Management Updates," EMC Corporation, Hopkinton, MA, Oct. 2004, 2 pages.

EMC Centera Partner Solutions, "EMC-LEGATO E-mail Archiving Solution," EMC Corporation, Hopkinton, MA, Jul. 2004, 4 pages.

"EMC: Information Lifecycle Management: Real Results for Business Realities," EMC Corporation, Hopkinton, MA, http://www.emc.com/ilm/ilm_update, printed Jan. 26, 2005, 4 pages.

"OLE Component Object Model," Object Services and Consulting, Inc., Dallas, Texas, http://www.objs.com/x3h7/ole2.htm, printed Mar. 14, 2005, 7 pages.

Webster's Seventh New Collegiate Dictionary, p. 952,1963, G. & C. Merriam Company, Springfield, Mass.

Kaplan, Steven M., Wiley Electrical and Electronics Engineering Dictionary, p. 638, 2004, IEEE Press, John Wiley & Sons, Inc., Hoboken, NJ.

* cited by examiner

US 8,055,724 B2

SELECTION OF MIGRATION METHODS INCLUDING PARTIAL READ RESTORE IN DISTRIBUTED STORAGE MANAGEMENT

FIELD OF THE INVENTION

The present invention relates generally to data networks, and more particularly to migration of files between file servers in a data network. The invention specifically relates to policy-based file migration such as hierarchical storage management in such a data network.

BACKGROUND OF THE INVENTION

Data network technology permits multiple users to share economically access to files in a number of file servers. Problems arise, however, in the assignment of files to particular servers. For example, it may be desirable to move a file from one file server to another when a new server is added to the network. A "CDMS" brand of data migration service provided by EMC Corporation of Hopkinton, Mass., can be used to move files from one file server to another while permitting concurrent client access to the files.

In a typical use of the EMC Corporation "CDMS" brand of data migration service, respective IP addresses are assigned to file servers. In order to migrate a file system from a source file server to a target file server, the IP address of the file server is reassigned from the source file server to the target file server, the file system is then mounted as a read-only file system in the source file server, and then the migration service is invoked in the target file server. The migration service in the target file server then begins a background process of using a protocol such as NFS, CIFS, HTTP or FTP to copy the files and directories from the read-only file system in the source file server to a temporary migration inode data structure in the target file server. The migration service in the target file server concurrently responds to client requests for access to a directory or file in the file system on a priority basis by checking the migration inode data structure to determine whether the directory or file has already been copied from the source file server to the target file server, and if so, then accessing the directory or file in the target file server, and if not, by fetching the directory or file from the source file server, storing the directory or file in the migration inode data structure in the target file server, and accessing the directory or file in the target file server. Once an entire file has been copied from the source file server to the target file server, the migration inode data structure for the file in the target file server is converted to a conventional inode data structure for the file in the target file server. The migration inode is converted to a conventional inode by allocating the conventional inode and initially setting an offline attribute bit of the conventional inode to indicate that the conventional inode is offline, transferring file system blocks associated with the migration inode to the conventional inode, deleting the migration inode, and clearing the offline attribute bit. Once all of the files of the file system have been copied from the source file server to the target file serve, the read-only version of the file system can be deleted from the source file server.

The EMC Corporation CDMS brand migration service uses a connection database for storing information about a connection over which file data is migrated between the source file server and the target file server. The connection database includes the following fields: for CIFS, the Server Name, Share name, User name, Password, Domain Server, and WINS server; and for NFS, the Server name, Path of exported share, Use Root credential flag, Transport protocol, Secondary server NFS/Mount port, Mount protocol version, and Local port to make the connection.

Files are also often moved between file servers in order to relocate infrequently accessed files from feature-rich, expensive, and highly-protected high-speed disk storage to more economical and possibly slower mass storage. In such a system, the high-speed disk storage is referred to as primary storage, and the mass storage is referred to as secondary storage. When a client needs read-write access to a file in the secondary storage, the file typically is moved back to the primary storage, and then accessed in the primary storage. This kind of migration of files between levels of storage in response to client requests based on file attributes such as the time of last file access and last file modification is known generally as policy-based file migration or more specifically as hierarchical storage management (HSM). It is desired for such policy-based or hierarchical storage management to be transparent to the clients, yet in practice there is always a trade-off between cost of storage and delay in file access.

In a data processing network employing hierarchical storage management, a client typically accesses a primary file server containing the primary storage, and the secondary storage is often in another file server, referred to as a secondary file server. When a file is moved from a primary file server to a secondary file server, the file in the primary file server is typically replaced with a stub file that contains attributes of the file and a link to the new file location in the secondary file server. The stub file can be accessed to redirect an access request from a client to the new file location in the secondary server, or to migrate data from the present file location back to the primary file server. This stub file can be a symbolic link file in a UNIX-based file system, or a shortcut file in a Microsoft WINDOWS file system. In a computer using the Microsoft WINDOWS operating system, access to a stub file may automatically result in access to the new file location. For example, an attempt to execute or open a shortcut will cause the Microsoft WINDOWS operating system to execute or open the target of the shortcut. Access of related files (i.e., object linking supported by OLE) can have problems of links that are easily broken when the end user manually changes the location of the related files.

SUMMARY OF THE INVENTION

The objective of the present invention is to enhance the file migration methods available for use in storage management, and to provide increased flexibility in specifying and selecting the file migration methods to be used under various conditions, in order to improve the trade-off between the cost of storage and delay in file access. This invention also allows full transparency to clients and applications, independent of the actual location of the file data. This overcomes situations where a migrated file access method is not transparent to the client application.

In accordance with a first aspect, the invention provides a method of operating a file server in a data network for access to file data that is migrated between primary storage and secondary storage. The file server responds to a client request for read access to a specified file by checking whether file data of the specified file has been migrated from the primary storage to the secondary storage, and upon finding that file data of the specified file has been migrated to the secondary storage, selecting a particular one of a number of offline file read access methods that are selectable by the file server under various conditions. The read access methods include a partial read migration method for migrating only a portion of the data of an offline file from the secondary storage to the primary storage for retention in the primary storage after client read access, and a pass-through method in which the file server obtains file data from the secondary storage and passes on to a client the file data obtained from the secondary storage without retention in the primary storage of the file data obtained from the secondary storage.

In accordance with another aspect, the invention provides an apparatus including a file server for access to file data that is migrated between primary storage and secondary storage. The file server is programmed for responding to a client request for read access to a specified file by checking whether file data of the specified file has been migrated from the primary storage to the secondary storage, and upon finding that file data of the specified file has been migrated from the primary storage to the secondary storage, selecting a particular one of a number of offline file read access methods that are selectable by the file server under various conditions. The read access methods include a partial read migration method for migrating only a portion of the data of an offline file from the secondary storage to the primary storage for retention in the primary storage after client read access, and a pass-through method in which the file server obtains file data from the secondary storage and passes on to a client the file data obtained from the secondary storage without retention in the primary storage of the file data obtained from the secondary storage.

In accordance with yet another aspect, the invention provides an apparatus including a primary file server for access to file data that is migrated between primary storage of the primary file server and secondary storage of at least one secondary file server. The primary file server is programmed for responding to a client request for read access to a specified file by checking whether file data of the specified file has been migrated from the primary storage to the secondary storage, and upon finding that file data of the specified file has been migrated from the primary storage to the secondary storage, selecting a particular one of a number of offline file read access methods that are selectable by the primary file server under various conditions. The primary file server is programmed for checking whether a particular one of the number of offline file read access methods that are selectable by the primary file server under various conditions has been set as a run-time option for a file system containing the specified file, and upon finding that a particular one of the number of offline file read access methods that are selectable by the primary file server under various conditions has been set as a run-time option for a file system containing the specified file, selecting the particular one of the number of offline file read access methods that are selectable by the primary file server under various conditions that has been set as a run-time option for a file system containing the specified file. The primary file server is also programmed for checking whether a particular one of the number of offline file read access methods that are selectable by the primary file server under various conditions has been set up for a connection to be used for migration of data of the specified file, and upon finding that a particular one of the number of offline file read access methods that are selectable by the primary file server under various conditions has been set up for a connection to be used for migration of data of the specified file, selecting the particular one of the number of offline file read access methods that are selectable by the primary file server under various conditions that has been set up for the connection to be used for migration of data of the specified file. The primary file server is also programmed for checking whether a particular one of the number of offline file read access methods that are selectable by the primary file server under various conditions has been set in an offline attribute of the specified file, and upon finding that a particular one of the number of offline file read access methods that are selectable by the primary file server under various conditions has been set in an offline attribute of the specified file, selecting the particular one of the number of offline file read access methods that are selectable by the primary file server under various conditions that has been set in an offline attribute of the specified file.

BRIEF DESCRIPTION OF THE DRAWINGS

Additional features and advantages of the invention will be described below with reference to the drawings, in which.

Figure 1:
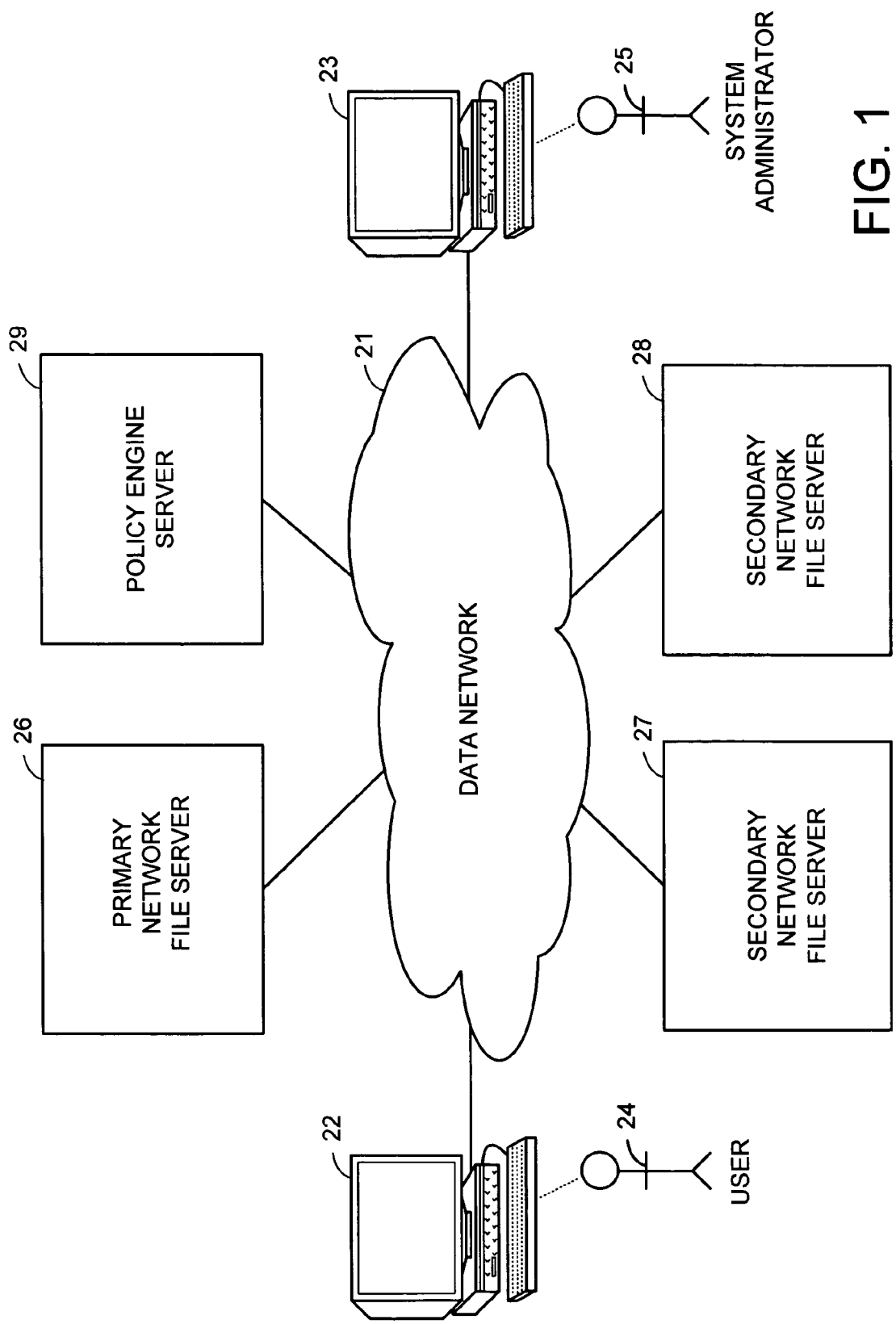
FIG. 1 is a block diagram of a data network including file servers for serving client workstations operated by respective users, and a policy engine server for initiating migration of file data from a primary file server to at least one secondary file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers operated by human users 24, 25. The servers include a primary network file server 26, secondary network file servers 27 and 28, and a policy engine server 29.

The primary network file server 26, for example, is a cached disk array as described in Vahalia et al., U.S. Pat. No. 5,893,140 issued Apr. 6, 1999, incorporated herein by reference. Such a cached disk array 26 is manufactured and sold by EMC Corporation, 176 South Street, Hopkinton, Mass. 01748. The secondary network file serves 27 and 28, for example, are similar to the primary network file server 26 except that they have a relatively small amount of cache memory, and a relatively large array of relatively slow, high-capacity disk drives, such as ATA disk drives.

The primary network file server 26 is programmed to respond to a command for migrating the data of a specified file from the primary file server to a specified secondary network file server while retaining metadata for the file in the primary file server. The metadata for the file includes the typical file attributes and also additional offline attributes including a complete network pathname to the specified secondary file server and the file data in the specified secondary file server. Once the file data has been migrated, the file is said to be "offline." The primary file server is also programmed to access the file data of offline files in various ways in response to client requests for read or write access to the offline files. In a preferred implementation, the secondary file servers are configured to disallow the clients from directly accessing the file data that has been migrated from the primary file server. Also, in the preferred implementation, the primary file server is configured to disallow the migration of data from directories so that directories are not permitted to be offline files. However, in an alternative implementation, the primary file server could be configured to allow migration of data from directories so that directories could be permitted to be offline files.

The data processing system in FIG. 1 includes a policy engine server 29 that decides when a file in the primary network file server should become offline. The policy engine server 29 is activated at scheduled times, or it may respond to events generated by specific file type, size, owner, or a need for free storage capacity in the primary network file server. Migration may be triggered by these events, or by any other logic. When free storage capacity is needed in the primary network file server, the policy engine server 29 scans file attributes in the primary file server in order to identify online files and to select an online file to become offline. The policy engine server 29 may then select a secondary network file server to become the secondary storage for the data of the selected online file, and send a migration command to the primary network file server specifying the selected online file and the selected secondary network file server. In a preferred implementation, however, the policy engine server 29 in not involved in any decision to restore an offline file to online status. Once data of a file has been migrated to secondary storage and the offline attributes of the file have been set to indicate that the file is offline, the policy engine server can be shut down without affecting in any way the recall of the file data from secondary storage.

It is also possible to pre-schedule a recall of specific files or directories. This can be done in preparation for a predicted need for this information. An example of such a situation is preparation of files that will be required to be read or modified for periodic reporting needs. For example, the primary network file server 26 maintains a recall list 75 of directories or files and a respective time in the future that each such directory or file should be migrated from secondary storage to the primary storage if the directory or file is offline at that time. The primary network file server, for example, places a directory or file on the recall list 75 in response to a request from a client. An example of a procedure for servicing the recall list 75 is further described below with reference to FIG. 6.

Figure 2:
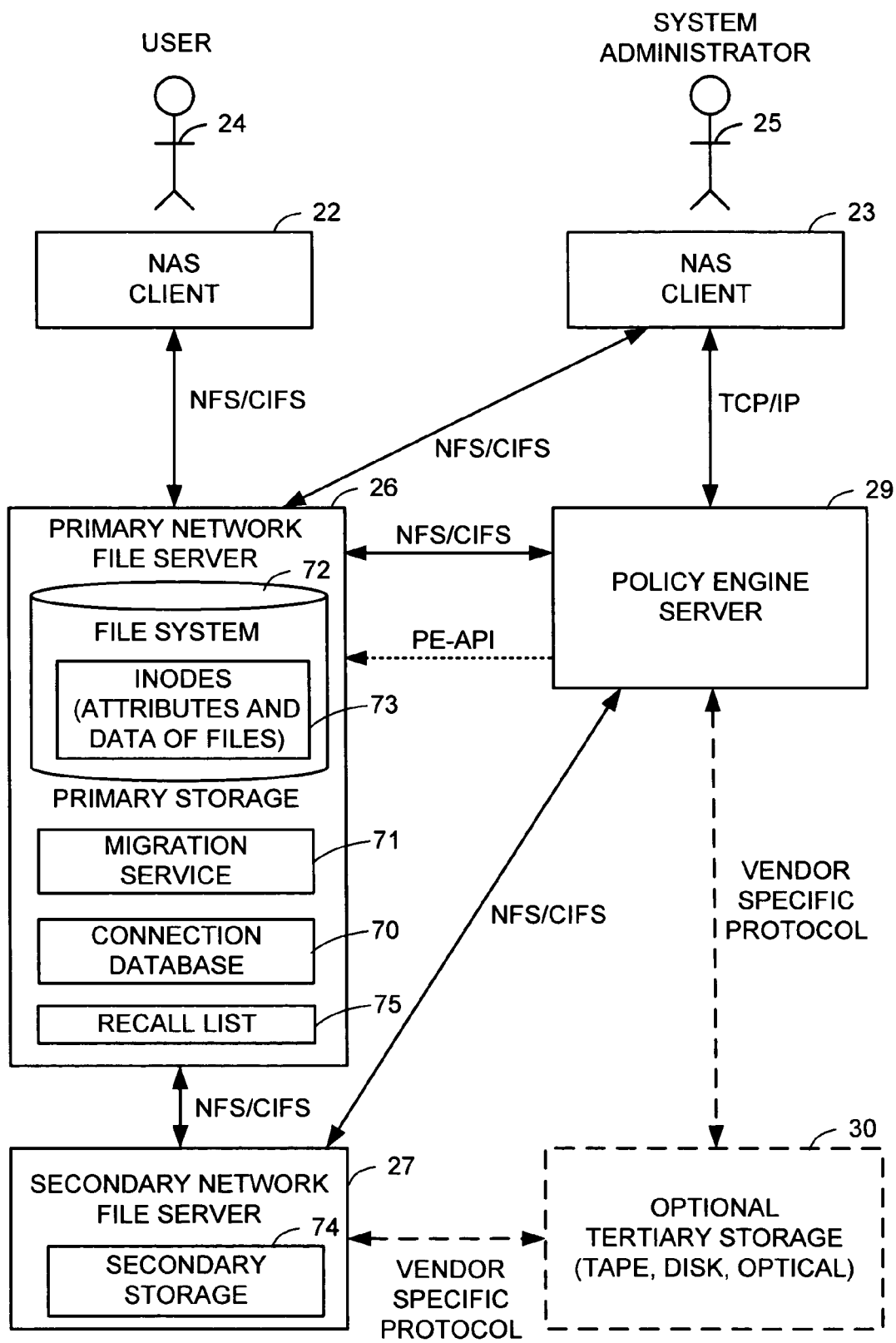
FIG. 2 is a diagram of data and control flow between the clients and servers in the data network of FIG. 1.

FIG. 2 shows the preferred flow of data and control between the clients and servers in the data network of FIG. 1. The network attached storage (NAS) clients 22, 23 use the network file system (NFS) or common internet file system (CIFS) protocols for access the primary network file server 26. The NAS client 23 of the system administrator 25 uses the TCP/IP protocol for setting policy rules in the policy engine 29. The policy engine server 29 uses NFS or CIFS for accessing attributes of files in the primary network file server 26 and in the secondary network file server 27. The policy engine server 29 sends a policy engine application interface (PE-API) command to the primary network file server 26 in order to initiate migration from the primary network file server 26 to the secondary network file server 27.

The primary network file server 26 and the secondary network file server 27 use the NFS, CIFS, or other data transfer protocols (HTTP, FTP, etc.) for migrating data from the primary network file server to the secondary network file server, and for the recall of data from the secondary network file server to the primary network file server. In order to migrate file data from the primary file server to the secondary file server, a NFS or CIFS connection is set up between the primary file server and the secondary network file server.

In a preferred implementation, the primary network file server has a connection database 70 for each file system 72 stored in the primary network file server. For example, the connection database for the preferred implementation includes the following fields: for CIFS, the Server Name, Share name, User name, Password, Domain Server, and WINS server; and for NFS, the Server name, Path of exported share, Use Root credential flag, Transport protocol, Secondary server NFS/Mount port, Mount protocol version, and Local port to make connection. For both types of connections, the connection database also includes a field for storing a specification of a migration method override. Using the connection database avoids storing all the credential information in the offline inode, and ensures that the connection information will survive a re-boot of the primary network file server.

A file is defined by one of the inodes 73 in the file system 72. Prior to migrating data during the change of the state of a file from online to offline, the file is associated with such a connection defined in the connection database 70 for the file system 72 containing the file. This is done by setting an offline attribute of the file with a connection ID that is an index or pointer to an entry for the connection in the connection database 70 for the file system 72.

The secondary file server 27 should enable writes by the policy engine server 29 during migration from the primary storage to the secondary storage 74. However, the secondary store file should not be modified after the initial data migration to secondary storage by the policy engine. This would cause I/O errors when reading offline data from the primary storage 74 since the modification time and size attributes of the primary store file are checked for consistency against the modification time and size attributes of the secondary store file when the primary storage system recalls offline file data from the secondary storage. Also reads from offline files on snapshots and backups would be inconsistent if the file on the secondary storage would be modified.

Virus checking programs should not update files on the secondary file server 27, because this may cause data inconsistency of files that correspond to offline inodes on the primary store. No secondary store file should be modified after the initial creation, so viruses should not be found on a secondary store file unless they existed on the corresponding original file in the primary file server. If a virus is introduced into a secondary store file after migration from primary to secondary storage, data migration from secondary to primary storage during recall will fail if the modification time/size of the offline inode is out-of-sync with the secondary store file.

If using NFS or CIFS, the secondary file server should allow connection by the file's owner from the primary file server, unless the connection associated with the file specifies root credentials. If the connection specifies root credentials, then the secondary file server should permit root access from the primary file server.

As further shown in FIG. 2, the data network may include optional tertiary storage 30 such as tape, disk, or optical storage. Such tertiary storage would use proprietary vendor specific protocols for transfer of data between the secondary network file server 27 and the tertiary storage, and for access of the policy engine server to the tertiary storage.

In a preferred implementation, a file migration service is used to copy a specified file from the primary network file server 26 to a new corresponding file on a secondary network file server. Then the online inode of the specified file in the primary network file server is converted to an offline inode in the primary network file server. The offline inode specifies a full absolute network pathname to the corresponding file in the secondary storage. Then all of the data blocks for the file in the primary network file server are freed.

When a client requests the primary file server for write access to a file, the write operation will fail if there is not enough free space for the file system on the primary file server or if the file system is read-only. If the file's inode is already online, writes proceed as usual. Otherwise, the file is brought online by a full migration of the file data from the secondary file server storing the data of the file to the primary file server. (Other policies for writing to an offline file are possible, such as writethrough. Such other policies may require complex coordination with other primary server functions.) For example, the full migration of the file data includes creating a migration inode and allocating file system data blocks, reading the file data from the secondary file server and writing the file data to the allocated file system data blocks and updating the migration inode. Once all of the file data has been migrated, the file is made online by converting the migration inode to an online inode, substituting the online inode for the offline inode for the file, and then de-allocating the offline inode for the file. The copy of the file in the secondary storage should not be deleted unless there is no snapshot or backup that refers to it. Once the file becomes online in the primary data storage system, the primary file server accesses the online file in the usual fashion.

When a client requests the primary file server for read access to a file, the read operation proceeds as usual if the inode is online. Otherwise, a particular one of a number of predefined methods for read access to an offline file is selected for accessing the file data from the secondary file server that stores the file data for the file. The predefined methods for read access to an offline file include a full read migration, a partial read migration, and a pass-through read of the file data. If there is insufficient free storage on the primary file server to support a full or partial read migration, then the pass-through method is selected. The pass-through method is also used for accessing a file in a file system that is mounted as read-only.

In a full read migration, the file is brought online by a full migration of the file data from the secondary file server storing the data of the file to the primary file server. Then the client accesses the online file in the usual fashion.

In a pass-through read of the file data, the primary file server reads the file data requested by the client from the secondary file server and returns the requested file data to the client, without creating a migration inode or allocating file system blocks for storage of the file data in the primary file server.

In a partial read migration, the client requests a read of specific file data. The primary file server responds by partial migration of file system data blocks including at least the specific file data. The file server may also migrate a certain number of additional file system data blocks following the last file system data block containing the specific file data, such as 128 additional file system data blocks. If all of the file system data blocks of the file happen to be migrated, the offline file can be made online. Otherwise, the migration inode becomes substituted for the offline inode. The offline attributes, however, indicate that the primary file server stores a partially migrated file. The client is given read access to the file as soon as the requested file data is recalled, unlike the usual fashion where the client will not get any data until the entire file is recalled. This advantage is particularly important for large files, thus making response time to a client or application much quicker.

In one preferred implementation, a partially migrated file always contains online file data (i.e., file data stored in primary storage of the primary file server) up to a certain maximum offset "y" that is less than the extent of the file. The maximum offset "y" is an offline attribute of the file. The primary file server responds to a client read request for data up to a specified offset "z" in the partially migrated offline file by checking whether the specified offset "z" is greater than the maximum offset "y", and if so, performing a partial read migration of additional file system data blocks file up to and including the file system data block containing the data for the specified offset "z" (and a certain number of additional file system data blocks), and if not, by accessing the file data in the primary file server in the usual fashion.

The primary file server may respond to a client request to truncate a partially migrated offline file at a specified offset "w" by checking whether the specified offset "w" is greater than the maximum offset "y", and if so, performing a partial read migration of additional file system data blocks up to and including the file system data block containing the data for the specified offset "w". Once the specified offset "w" is greater than the maximum offset "y", the file extent is set to "w", any file system blocks beginning after specified offset "w" are freed, and the offline file is made online. The copy of the file may then be deleted from the secondary file server.

Figure 3:
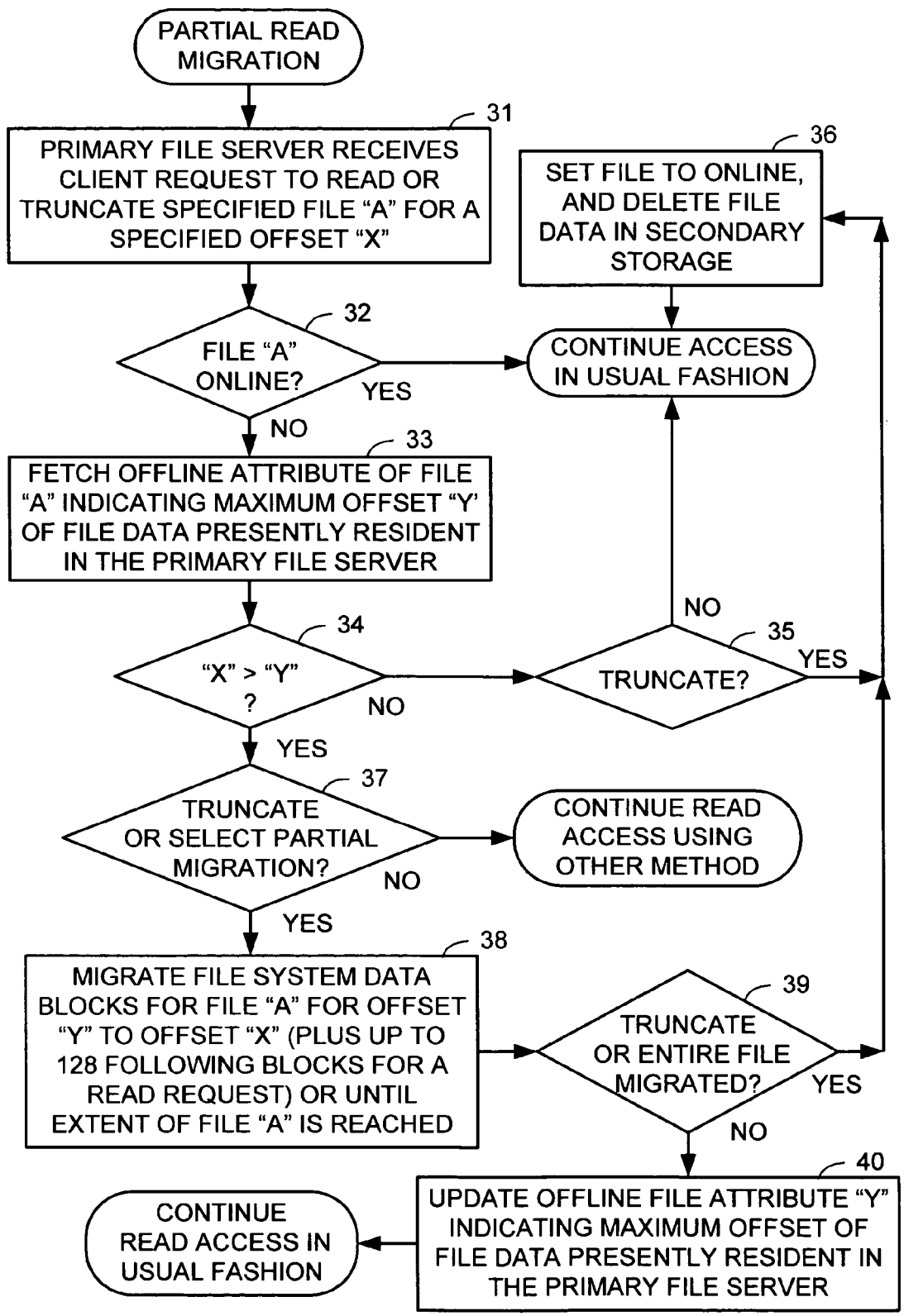
FIG. 3 is a flowchart showing how the primary file server of FIG. 1 may perform a partial read migration from a secondary file server when a client requests read access to an offline file, and showing how the primary file server may perform truncation upon a partially migrated offline file.

FIG. 3 shows programming of the primary file server for performing the partial read migration. In a first step 31, the primary file server receives a client request to read or truncate a specified file "A" for a specified offset "X". In step 32, the primary file server checks the attributes of the file "A" to determine whether the file "A" is online. If the file "A" is online, then access of the file continues in the usual fashion. Otherwise, execution continues to step 33.

In step 33, the primary file server fetches an attribute of the file "A" indicating a maximum offset "Y" of file data presently resident in the primary file server. In step 34, if the specified offset "X" is not greater than the maximum offset "Y" of data presently resident in the primary file server, then execution continues to step 35. In step 35, if the client has requested read access to the file, then the read access continues in the usual fashion. Otherwise, if the client has requested a truncation of the file, execution continues to step 36. In step 36, the primary file server sets the file attributes to indicate that the file is online, and may instruct the secondary file server to delete the file data in the secondary storage. Then file access continues in the usual fashion for a file truncation operation (by resetting the file offset to the specified offset "X", and freeing any file system blocks that do not include any file data up to and including the specified offset "X").

In step 34, if the specified offset "X" is greater than the maximum offset "Y" of data presently resident in the primary file server, then execution continues to step 37. In step 37, if truncation was requested, then execution continues to step 38. Otherwise, the primary file server selects one of a plurality of predefined methods for read access to offline file data, as further described below. If the primary file server selects the partial read migration method, then execution continues to step 38 to migrate file system data blocks for the file "A" for offset "Y" to offset "X" (plus up to 128 following blocks for a read request) or until the extent of the file is reached. In step 39, if the migration of file system blocks in step 38 has resulted in the migration of the entire file, then execution branches to step 36 to set the file to online. Otherwise, execution continues from step 39 to step 40. In step 40, the offline file attribute "Y" indicating the maximum offset of file data presently resident in the primary file server is updated, and then read access to the specified file "A" is continued in the usual fashion.

In a preferred implementation, a new file system attribute is provided for indicating whether or not the file system supports offline files and the above-described read and write migration and access methods for hierarchical storage management. A new file attribute is provided for setting a per file migration method, and overrides are also provided for the file system and also per connection. The file system migration method settings can be run-time options instead of mount options. This will allow the system administrator to temporarily override the read and write migration policies. Such an option is useful, for example, in order to use pass-through reads instead of migration during network backups from NFS. In addition, backup and virus scanning programs can override the migration method to allow pass-through reads for individual files.

Figure 4:
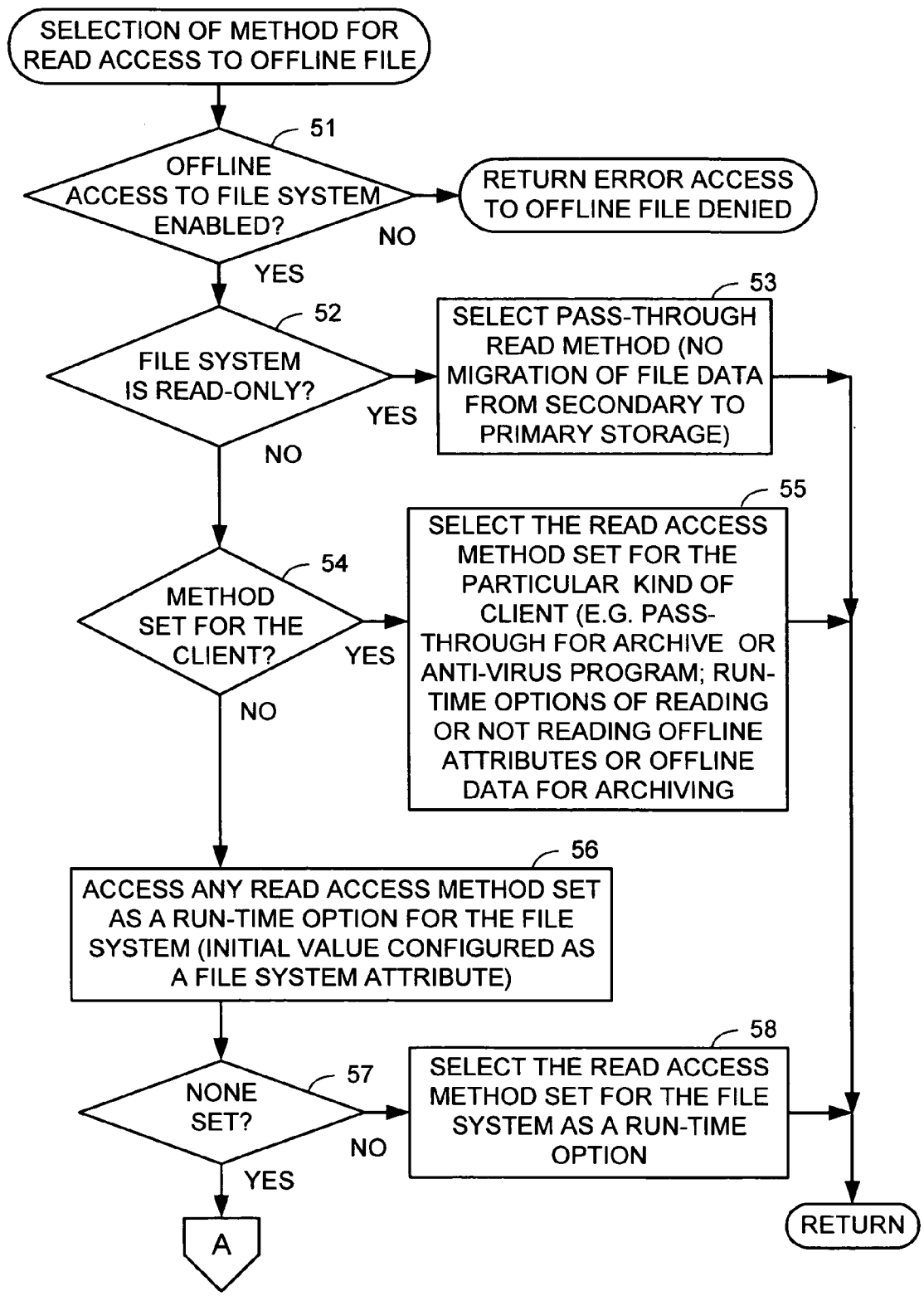
FIGS. 4 and 5 together comprise a flowchart showing how the primary file server of FIG. 1 may select a particular method for read access to an offline file.

FIG. 4 shows the preferred programming of the primary file server for selection of a method for read access to an offline file in response to a client request. In a first step 51, if offline access to the file system of the file has not been enabled, then the primary file server returns an error to the client indicating that access to an offline file has been denied because the specified file is offline and offline access to the file system including the specified file has not been enabled. Otherwise, execution continues to step 52.

In step 52, if the file system of the offline file is read-only, then execution branches to step 53 to select the pass-through read method. In this case, there is no migration of the file data from the secondary storage to the primary storage. Instead, the primary file server requests the secondary file server containing the requested data to read and return the requested data, and the primary file server receives the requested data and returns the requested data to the client without retaining the requested data in the primary storage of the primary file server. If the file system of the offline file is not read-only, then execution continues from step 52 to step 54.

In step 54, the primary file server checks whether the request for read access has been made by a particular kind of client for which a read access method has been set. If the request for read access has been made by a particular kind of client for which a read access method has been set, then execution branches to step 55 to select the read access method that has been set for the particular kind of client. For example, if the client is an archive program or an anti-virus program, then the primary file server selects the pass-through method for read access to the offline file. At least for archiving, it is also useful to provide run-time options of reading or not reading the offline attributes stored in the primary file server, and reading or not reading offline data. For virus checking, it may be desirable for the primary file server to report to the virus checker program the path to the corresponding offline file on the secondary file server, so that the virus checker program may include this path in any report of a virus infection.

It may be desirable for the archive program to backup the offline attributes, including the location of the file data on the secondary store, so that the archive program can restore both a replacement primary file server and a replacement secondary file server to the backed-up state in the event of a disaster destroying both the primary file server and the secondary file server. It may also be desirable for the archive program to have a run-time option of backing up all the file data (using pass-through reads to offline file data) but not the offline attributes for the case where it would be desirable simply to restore all the file data to one replacement primary file server. It may also be desirable for the archive program to have a run-time option of backing up the file data and offline attributes in the primary file server but not file data in secondary storage for the case where it would be desirable to backup only the file attributes in a primary file server for restoring only the portion of a file system in the primary file server in the event of a failure of the primary file server.

In step 54, if a read access method is not set for the particular kind of client, then execution continues to step 56. In step 56, the primary file server accesses any read access method set as a run-time option for the file system containing the offline file. Such a run-time option is kept in memory of the primary file server as part of the file system state, and it is initially set at boot time of the primary file server with a value that has been configured as an on-disk file system attribute. The initial value, however, can be "None", meaning that no read access method has been set for the file system. By keeping a read access method specification for offline files as part of the file system state, the read access method specification will migrate with snapshots and replicated file systems. In step 57, if a read access method has been set for the file system, then execution branches to step 58 to select the read access method that has been set for the file system. If none has been set, then execution continues from step 57 to step 61 of FIG. 5.

Figure 5:
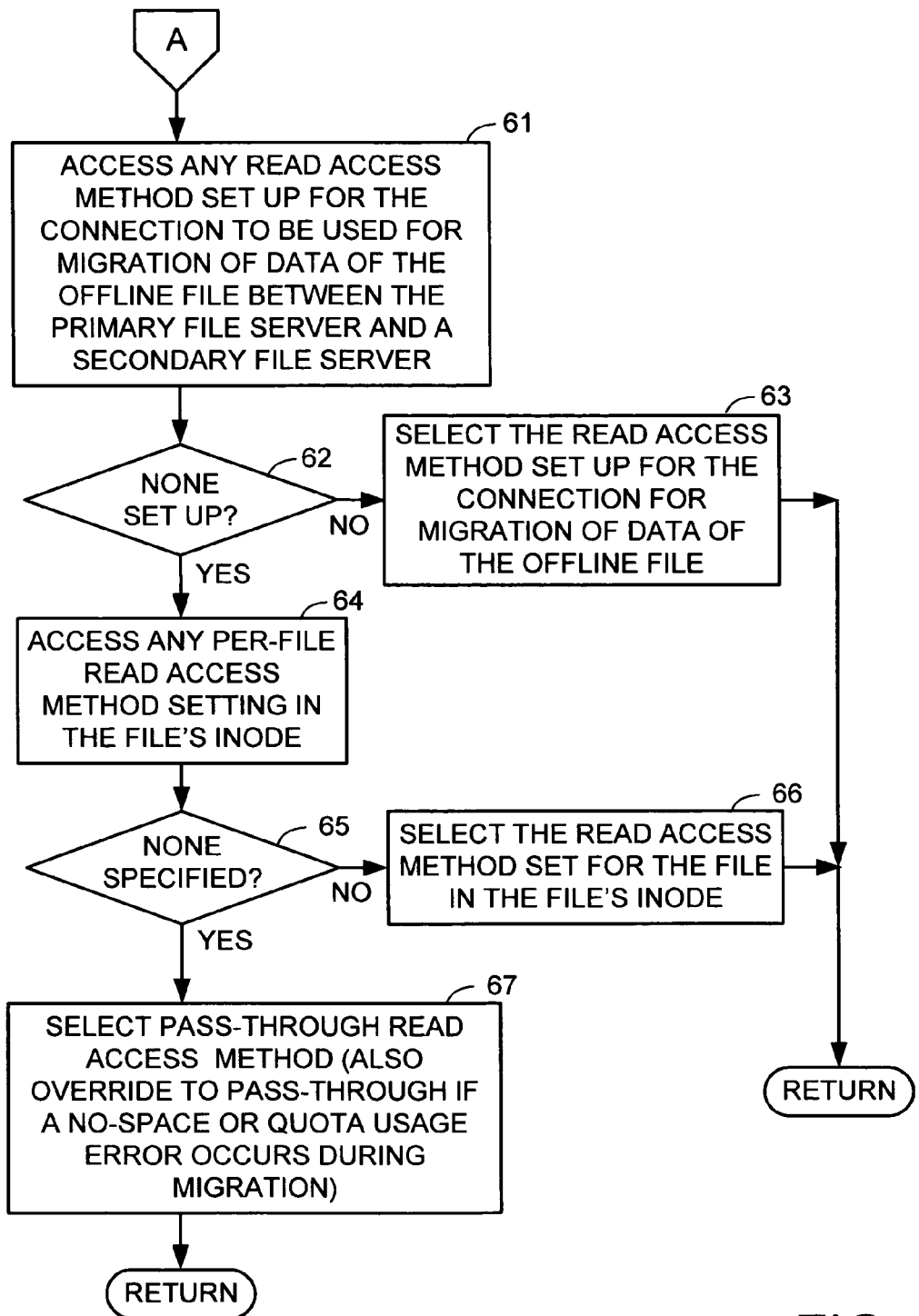

In step 61 of FIG. 5, the primary file server accesses any read access method set up in the connection database in association with the connection to be used for migration of data of the offline file between the primary file server and a secondary file server. As introduced above, the inode of the offline file has a connection_ID indexing or pointing to an entry in the connection database for the file system including the offline file. This entry includes a read migration method attribute specifying an offline file read access method or "None" if none has been set up for the connection. If a read migration method has been set up for the connection, then execution branches from step 62 to step 63 to select the read access method that has been set up for the connection for migration of data of the offline file. In step 62, if none has been set up for the connection, then execution continues from step 62 to step 64.

In step 64, the primary file server accesses any per-file read access method setting in the offline file's inode (i.e., the inode of a stub file). In step 65, if a read access method is specified in the offline file's inode, then execution branches to step 66 to select the read access method set for the offline file in the offline file's inode. In step 65, if none has been specified in the offline file's inode, then execution continues to step 67.

In step 67, the primary file server selects, as a default, the pass-through read access method. Moreover, if a no-space or quota usage error occurs during read migration by the other methods, then the read access method will override to pass-through so that no more primary storage will be allocated during the read access.

The selection of a method for read access to a paused offline file system is handled as shown in FIGS. 4 and 5. If the selected read access method is partial or full migration, however, the migration will not occur until the file system is unpaused.

Figure 6:
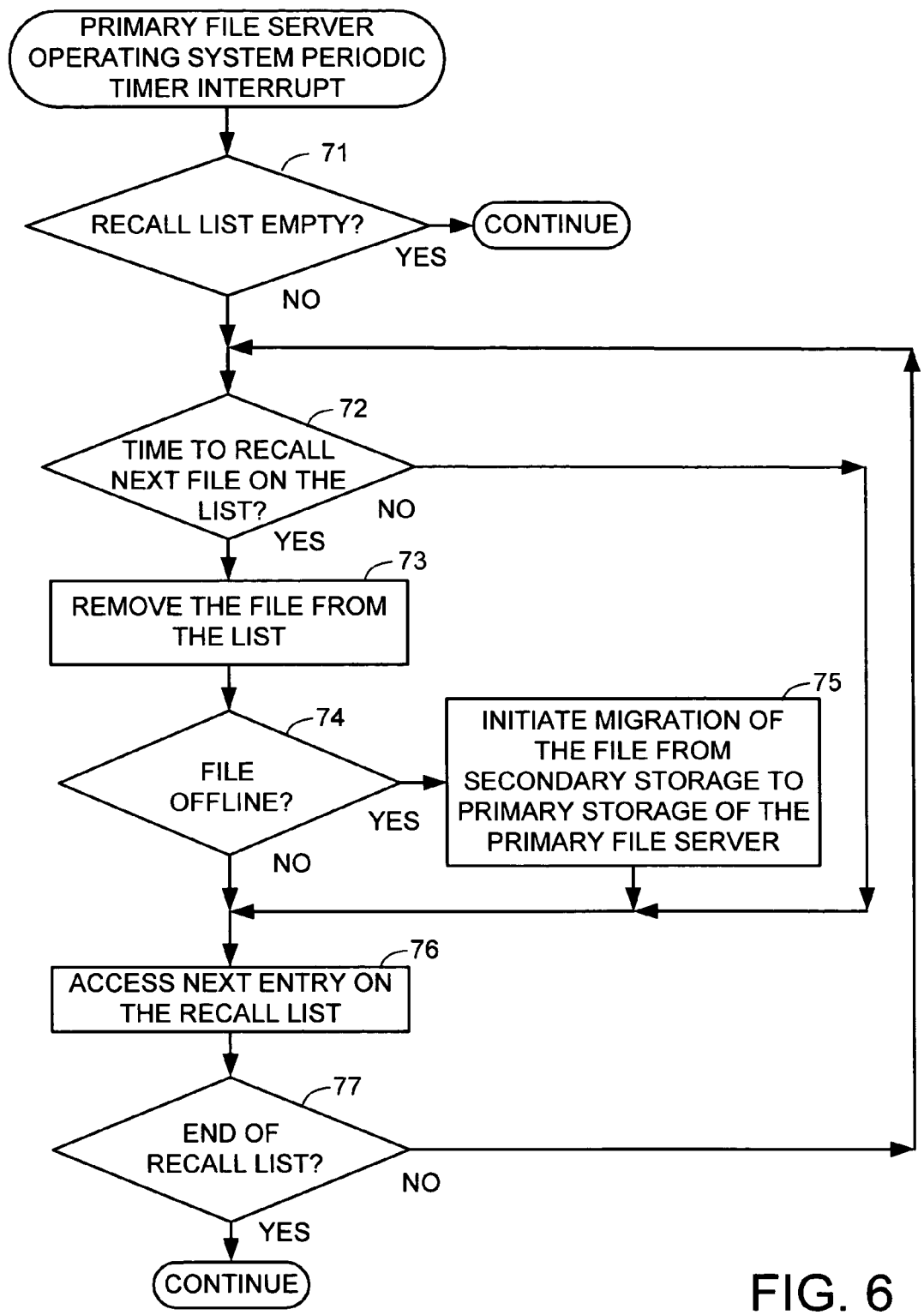
FIG. 6 is a flowchart of a procedure for servicing a recall list in a primary file server.

FIG. 6 shows a flowchart of a procedure used in the primary file server for servicing the recall list (75 in FIG. 2). This procedure is part of a periodic timer interrupt routine of the operating system of the primary file server. For example, the recall list is serviced once every 30 seconds. It would also be possible to have multiple recall lists, each serviced at a respective interval of time.

In a first step 71 of FIG. 6, if the recall list is empty, then the servicing of the list is finished for the current interval. The periodic timer interrupt routine can continue servicing other tasks. Otherwise, execution continues from step 71 to step 72. In step 72, the recall time of the next entry on the recall list is compared to the present time to determine whether it is time to recall the file of this entry on the recall list. If so, then execution continues to step 73 to remove the file from the list. In step 74, if the file is presently offline, then in step 75 the primary file server initiates migration of the file from secondary storage to primary storage of the primary file server. Execution continues from step 75 to step 76. Execution also continues to step 76 from step 74 if the file is online. Execution also continues to step 76 from step 72 if it is not time to recall the next file on the recall list.

In step 76, the next entry on the recall list is accessed. If the end of the recall list is not reached, as tested in step 77, then execution loops back to step 72 to service this next entry on the recall list. Otherwise, servicing of the recall list is finished for the present time interval, and the periodic timer interrupt routine continues from step 77 with servicing of other tasks.

In a preferred implementation, the offline file attributes used for hierarchical storage management are stored in an opaque data area of each inode. The offline inode fields include an inode type (e.g. migration or hierarchical storage) and inode connection type (NFSv2, NFSv3, CIFS, or other); offline inode related flags (e.g. a flag for indicating that the migration inode field is invalid, and a flag for indicating that the offline inode has been modified); a staging (migration) inode number for keeping track of pull-in progress during migration; the per offline file read and write access methods (coded as either Default, Full Migration, Pass-through, Partial, or None); a verifier such as file modification time for the secondary data file; a migration in-progress connection ID pointing to the open connection in the connection database for the file system; a file handle (NFS only); a URL specifying an absolute path to the secondary storage file and including a server name, a CIFS share name or NFS export path, and a relative pathname in the share or export path. Since the offline attributes are opaque, file system calls can be provided to permit archiving programs to directly access and update the offline attributes.

For consistency, the various threads that modify the offline inode's opaque data contents should use a locking mechanism. For example, any thread that updates the offline inode should use the following sequence: (1) acquire a migration mutex for the inode; (1) read the opaque data structure; write the opaque data structure; release the migration mutex for the inode.

In a preferred implementation, the per file system parameters for hierarchical storage management include the following: hierarchical storage enabled/disabled; offline attribute true/false; offline access error timeout (time limit for reporting slow access to secondary storage); offline backup policy (offline attributes saved or not, offline data saved or not); file system read migration policy (default, full, partial, none); file system write migration policy (default, full, partial, none). The default backup policy (for CIFS) is save offline data.

Figure 7:
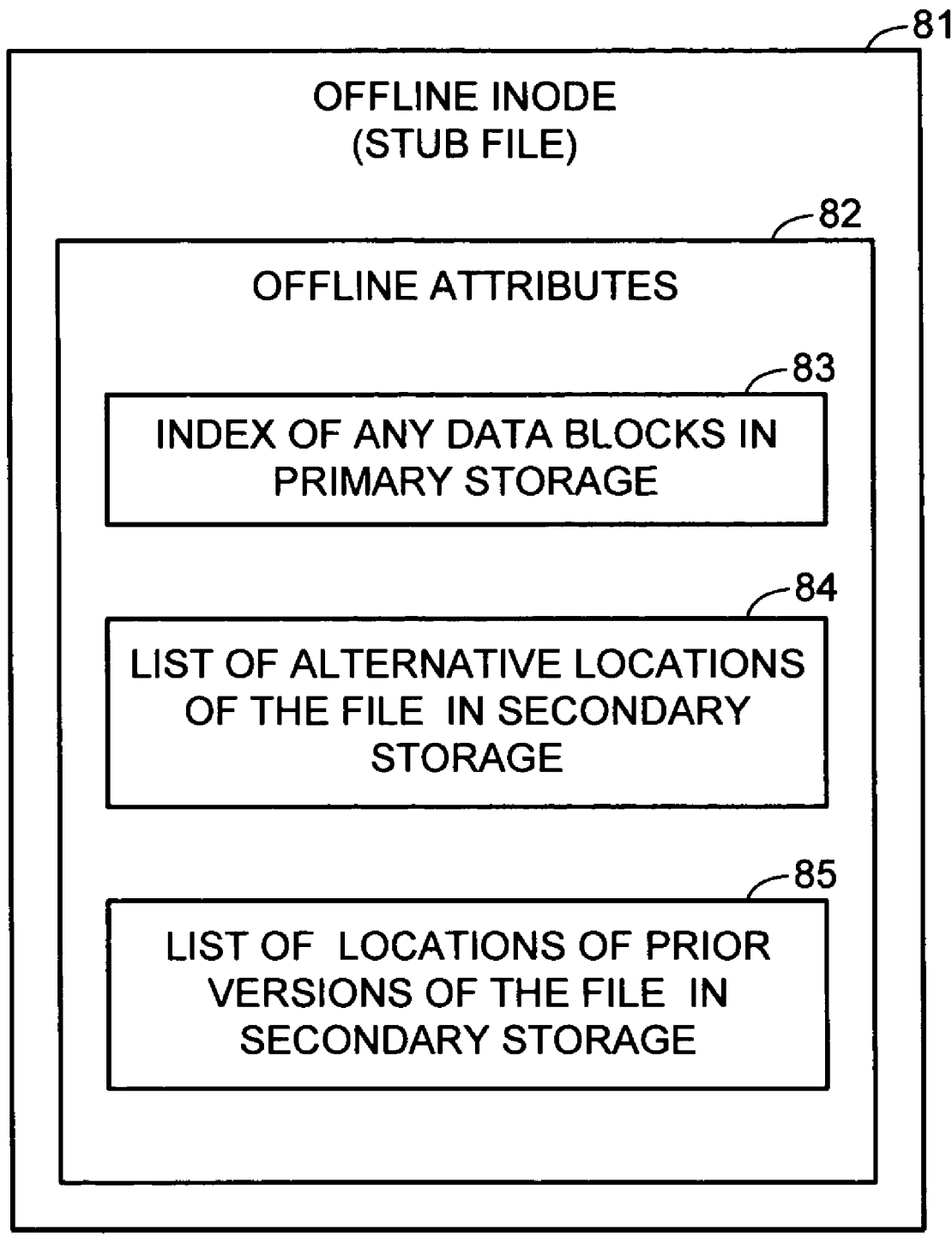
FIG. 7 is a block diagram of an offline inode including a map of data blocks in primary storage, a list of alternative locations of copies of the file in secondary storage, and a list of locations of prior versions of the file in secondary storage.

As shown in FIG. 7, the offline inode 81 (i.e., the stub file) can include additional offline attributes for extended functionality. As described above, for one preferred implementation, a partially migrated file always includes on-line file data up to a specified offset "y". This implementation is satisfactory for sequential files having file blocks that are usually read by a client consecutively starting with a first file data block. As shown in FIG. 7, for supporting efficient partial read migration of randomly-accessed files, the offline file attributes may include an index 83 of any data blocks in primary storage. The index 83, for example, is a hash index of the kind typically used for indexing a cache memory of a cached disk storage array. When an offline file has such an index 83 and a client requests data contained in a data block or a range of data blocks, the index 83 is accessed, and if the index 83 indicates that one or more of the requested data bocks are absent from the primary storage of the primary file server, then only the absent data blocks are migrated from secondary storage to the primary storage in response to the client request.

As further shown in FIG. 7, the offline inode 81 may include a list 84 of alternative locations of the file in secondary storage. Such a list 84 of alternative locations is useful where multiple identical copies of a file have been stored in secondary storage in order to provide high availability, flow control, or load balancing. For disaster protection, for example, one copy is kept in secondary storage at a location close to the primary file server, and at least one other copy is kept in secondary storage at a geographically remote location. If the local copy in secondary storage is unavailable, then the remote copy is accessed. In this case, the list 84 of alternative locations is ordered by the geographic proximity of the respective copies in the secondary storage, and the entries of the list 84 are sequentially accessed in order of priority until a copy is found to be accessible. In general, to provide high availability, the alternative locations in the list 84 can be ordered based on the estimated access time from respective locations, so that attempts are first made to access secondary storage likely to provide fast access to the data.

It is also possible, however, for respective copies of a file to be stored at a plurality of equally accessible secondary storage sites. The primary file server can select a particular copy to be accessed based on load balancing or flow control. For example, for load balancing, the primary file server can use the well-known round-robin method in which a next one of the copies in the list is selected each time one of the copies needs to be accessed. Flow control can be implemented by the secondary sites reporting to the primary file server conditions of high loading or unavailability so that the primary file server will discount or avoid selection of a secondary site reporting high loading or unavailability. Statistics on the response time at the various secondary locations can be collected and used to frequently prioritize or modify the alternative locations in the list 84.

FIG. 7 further shows that the offline attributes 82 may include a list of locations of prior versions of the file in secondary storage. Each prior version of the file is a snapshot copy of a prior consistent state of the file as it existed at a particular point in time. A client, for example, may request one or more of these prior versions of the file for recovery purposes if the present version of the file becomes unavailable due to a widespread system failure or due to inadvertent or malicious data corruption. A snapshot copy facility can create the prior versions of the file while permitting concurrent read-write access to the file. Such a snapshot copy facility, for example, is described in Keedem U.S. Pat. No. 6,076,148 issued Jun. 13, 2000, incorporated herein by reference, and in Armangau et al., U.S. Pat. No. 6,792,518, incorporated herein by reference. Snapshot copies have been used for a variety of data processing and storage management functions such as storage backup, transaction processing, and software debugging.

In view of the above, it has been shown how to build upon a conventional file migration service in order to construct a hierarchical storage system from file servers and a policy engine server. In particular, offline attributes have been added to file system inodes in the primary file server, file system parameters have been added in the primary server, an offline read access method field has been added to a connection database, and the primary file server has been programmed to use these attributes and parameters for selecting a particular method (such as a partial read migration or a pass through read method) for read access to an offline file. In this fashion, the primary file server is provided with flexibility for selecting a particular one of a number of migration methods depending on various conditions, in order to improve the trade-off between the cost of storage and delay in file access. There is no need for the primary file server to access another server to determine the location of the offline file data in secondary storage, because the primary file server maintains, in an offline attribute of the file in primary storage, an absolute network pathname to the location of the offline file data in secondary storage. In addition, the partial read migration and the pass through read methods prevent a massive data recall of data for large offline files when a full migration would be of little or no benefit.

It has also been shown that the offline attributes may specify multiple secondary locations for the same file. Thus, if a file is not available at one location because of the failure of the secondary file server or the network connection to it is unavailable to it, then the file will be retrieved from an alternative location specified in the offline stub file. Such an implementation improves the availability of the file system. This also provides infrastructure to implement heuristics to provide load balancing and flow control among secondary file servers. For example, the offline inode and stub file holds a list of secondary locations for a specific file, and the list is prioritized, scanned frequently, and modified to achieve flow control and load balancing.

What is claimed is:

1. A method of operating a file server in a data network for access to file data that is migrated between primary storage and secondary storage, the file server responding to a client request for read access to a specified file by checking whether file data of the specified file has been migrated from the primary storage to the secondary storage, and upon finding that file data of the specified file has been migrated from the primary storage to the secondary storage, selecting a particular one of a number of offline file read access methods that are selectable by the file server under various conditions, the offline file read access methods including a partial read migration method for migrating only a portion of the data of an offline file from the secondary storage to the primary storage for retention in the primary storage after client read access, and a pass-through method in which the file server obtains file data from the secondary storage and passes on to a client the file data obtained from the secondary storage without retention in the primary storage of the file data obtained from the secondary storage;

which further includes the file server responding to a request to truncate a partially migrated offline file to a new offset that is less than an extent of the partially migrated offline file, the file server responding to the request to truncate the partially migrated offline file by checking whether data of the partially migrated offline file up to the new offset is presently resident in the primary storage of the file server, and upon finding that data of the partially migrated offline file up to the new offset is presently resident in the primary storage of the file server, truncating the partially migrated offline file to the new offset by setting the extent of the partially migrated offline file to the new offset, and setting the partially migrated offline file to online status.

2. The method as claimed in claim 1, which includes the file server selecting the pass-through read method upon finding that the specified file is in a read-only file system.

3. The method as claimed in claim 1, wherein the specified file is one of a plurality of files contained in a file system, and the method includes the file server checking a file system attribute of the file system indicating whether a particular one of the number of offline file read access methods that are selectable by the file server under various conditions has been set as a run-time option for the file system, and upon finding that a particular one of the number of offline file read access methods that are selectable by the file server under various conditions has been set as a run-time option for the file system, selecting the particular one of the number of offline file read access methods that are selectable by the file server under various conditions that has been set as a run-time option for the file system.

4. The method as claimed in claim 1, which includes the file server checking whether the client request for read access was made by a particular kind of client for which a particular one of the number of offline file read access methods that are selectable by the file server under various conditions that has been set, and upon finding that the client request for read access was made by a particular kind of client for which a particular one of the number of offline file read access methods that are selectable by the file server under various conditions has been set, selecting the particular one of the number of offline file read access methods that are selectable by the file server under various conditions that has been set for the particular kind of client.

5. The method as claimed in claim 1, which includes the file server responding to read requests from an archiving client by checking whether the read requests originated from an archiving kind of client, and upon finding that the read requests originated from an archiving kind of client, checking whether runtime options for an archiving client type have been set for reading or not reading offline attributes of offline files, and for reading or not reading offline data of offline files.

6. The method as claimed in claim 1, which includes the file server responding to a read request from an anti-virus checking client for reading an offline file by checking whether the read request originated from an anti-virus checking kind of client, and upon finding that the read request originated from an anti-virus checking kind of client, selecting a pass-through read method for servicing the read request from the anti-virus checking client.

* * * * *